(12) United States Patent
Yamasaki et al.

(10) Patent No.: US 10,484,913 B2
(45) Date of Patent: Nov. 19, 2019

(54) COMMUNICATION CONTROL METHOD, COMMUNICATION CONTROL DEVICE, AND COMMUNICATION SYSTEM FOR CAUSING READINESS FOR MOVEMENT OF A COMMUNICATION TERMINAL

(71) Applicant: NTT DOCOMO, INC., Chiyoda-ku (JP)

(72) Inventors: Takeo Yamasaki, Chiyoda-ku (JP); Motoshi Tamura, Chiyoda-ku (JP); Shigeru Iwashina, Chiyoda-ku (JP); Lan Chen, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 69 days.

(21) Appl. No.: 15/740,647

(22) PCT Filed: Jun. 24, 2016

(86) PCT No.: PCT/JP2016/068888
§ 371 (c)(1),
(2) Date: Dec. 28, 2017

(87) PCT Pub. No.: WO2017/002735
PCT Pub. Date: Jan. 5, 2017

(65) Prior Publication Data
US 2018/0192330 A1  Jul. 5, 2018

(30) Foreign Application Priority Data
Jun. 29, 2015  (JP) .................................. 2015-130475

(51) Int. Cl.
*H04W 36/00* (2009.01)
*H04W 36/16* (2009.01)
(Continued)

(52) U.S. Cl.
CPC ....... *H04W 36/0016* (2013.01); *H04W 36/16* (2013.01); *H04W 88/18* (2013.01); *H04W 36/08* (2013.01)

(58) Field of Classification Search
CPC ......... H04W 36/0016; H04W 36/0033; H04W 36/16; H04W 36/08; H04W 88/18
See application file for complete search history.

(56) References Cited

U.S. PATENT DOCUMENTS

2013/0336286 A1* 12/2013 Anschutz .............. H04W 36/08
370/331
2014/0105174 A1* 4/2014 Agrawal ............... H04W 76/10
370/331
(Continued)

FOREIGN PATENT DOCUMENTS

| EP | 2 770 800 A1 | 8/2014 |
| GB | 2502266 A | 11/2013 |
| WO | WO 2015/040866 A1 | 3/2015 |

OTHER PUBLICATIONS

"Announcing the 'Edge computing' concept and the 'Edge accelerated Web platform' prototype to improve response time of cloud applications", NTT Press Releases, Jan. 23, 2014 (Year: 2014).*
(Continued)

*Primary Examiner* — Robert C Scheibel
(74) *Attorney, Agent, or Firm* — Oblon, McClelland, Maier & Neustadt, L.L.P.

(57) ABSTRACT

Provided are a communication control method, a communication control device, and a communication system that can appropriately change a device on a network that executes request processing from a terminal. In a node changing device 10, a sequence monitoring unit 12 detects handover of a UE 90. When the handover is detected, a placement calculation unit 14 acquires node information in the vicinity of a destination and activates nodes in the
(Continued)

vicinity based on the node information. In this manner, upon detecting movement of a communication terminal, the node changing device 10 activates nodes in the vicinity of the destination of the communication terminal, and it is thereby possible to prevent an increase in communication delay even when the communication terminal is moved.

5 Claims, 11 Drawing Sheets

(51) Int. Cl.
*H04W 88/18* (2009.01)
*H04W 36/08* (2009.01)

(56) References Cited

U.S. PATENT DOCUMENTS

| | | |
|---|---|---|
| 2014/0226594 A1 | 8/2014 | Liu |
| 2015/0245160 A1* | 8/2015 | Agrawal ........... H04M 15/8044 455/406 |
| 2016/0044560 A1 | 2/2016 | Anschutz |
| 2016/0165503 A1* | 6/2016 | Tajima .............. H04W 36/0011 370/331 |
| 2016/0381699 A1* | 12/2016 | Rubin ................. H04L 67/2809 370/329 |
| 2018/0295098 A1* | 10/2018 | Yuzawa .................. H04L 12/66 |

OTHER PUBLICATIONS

Written Opinion of the International Searching Authority dated Aug. 2, 2016 in Patent Application No. PCT/JP2016/068888 (with English translation).

Office Action dated Mar. 26, 2019, in European Patent Application No. 16 817 843.2, 6 pages.

International Search Report dated Aug. 2, 2016 in PCT/JP2016/068888, 1 page.

International Preliminary Report on Patentability dated Jan. 4, 2018 in PCT/JP2016/068888, 5 pages.

"Announcing the "Edge computing" concept and the "Edge accelerated Web platform" prototype to improve response time of cloud Applications", Retrieved from the internet: URL http://www.ntt.co.jp/news2014/1401/140123a.html , NTT Press Releases, Jan. 23, 2014, 8 Pages.

Extended Search Report dated May 4, 2018 in European Patent Application No. 16817843.2.

* cited by examiner

Fig.4

SERVICE POLICY TABLE

| SERVER APPLICATION ADDRESS | SERVICE NAME | POLICY |
|---|---|---|
| ADDRESS 1 | SERVICE 1 | USE EDGE UP TO 300 YEN/MONTH FOR ONE USER |
| ADDRESS 1 | SERVICE 2 | USE EDGE UP TO 200 USERS |
| ADDRESS 2 | SERVICE 3 | USE EDGE FOR 5G CONNECTION |
| ADDRESS 3 | SERVICE 4 | USE EDGE WHEN DOWNSTREAM TRAFFIC IS HEAVIER |
| ADDRESS 3 | SERVICE 4 | FOLLOW X2 HANDOVER |

Fig.5

EXECUTION LOCATION MANAGEMENT TABLE

| SERVICE NAME | LOCATION | USER ID |
|---|---|---|
| SERVICE 1 | EDGE 2 | USER 1 |
| SERVICE 1 | EDGE 3 | USER 1, USER 2 |
| SERVICE 1 | EDGE 4 | USER 1, USER 2 |
| SERVICE 1 | EDGE 5 | USER 2 |

*Fig.6*

EDGE INSTALLATION LOCATION
CORRESPONDENCE TABLE

| EDGE ID | INSTALLATION LOCATION ID |
|---------|--------------------------|
| EDGE 1  | eNB1                     |
| EDGE 2  | eNB2                     |
| ...     |                          |
| EDGE 20 | HOKURIKU AREA DC1        |

COMMUNICATION CONTROL METHOD, COMMUNICATION CONTROL DEVICE, AND COMMUNICATION SYSTEM FOR CAUSING READINESS FOR MOVEMENT OF A COMMUNICATION TERMINAL

TECHNICAL FIELD

The present invention relates to a communication control method, a communication control device, and a communication system.

BACKGROUND ART

Technology called Edge computing has been proposed, that distributes processing to edge servers in the vicinity of a terminal such as a smartphone on a network and thereby reduces the communication delay compared with the environment of cloud computing that is deployed in a centralized fashion on a global scale (Non Patent Literature 1).

CITATION LIST

Non Patent Literature

NPL1: "Announcing the 'Edge computing' concept and the 'Edge accelerated Web platform' prototype to improve response time of cloud applications", NTT Press Releases, Jan. 23, 2014.

SUMMARY OF INVENTION

Technical Problem

On the other hand, when handover occurs by the movement of a terminal, the distance from the terminal to an edge becomes longer, which causes an increase in communication delay. It is thus necessary to reduce the communication delay even with the occurrence of handover.

To solve the above problem, an object of the present invention is to provide a communication control method, a communication control device and a communication system that can prevent an increase in communication delay even when a terminal moves.

Solution to Problem

To achieve the above object, a communication control method according to one embodiment of the present invention is a communication control method in a communication system including a node for communicating with a communication terminal and executing request processing from the communication terminal, the method including a step of making a change so that a destination node, being one or more nodes in a destination, becomes ready to receive a request from the communication terminal and execute request processing when movement of the communication terminal is detected.

Further, a communication control device according to one embodiment of the present invention is a communication control device in a communication system including a node for communicating with a communication terminal and executing request processing from the communication terminal, the communication control device including a changing means for making a change so that a destination node, being one or more nodes in a destination, becomes ready to receive a request from the communication terminal and execute request processing when movement of the communication terminal is detected.

Further, a communication system according to one embodiment of the present invention is a communication system including a node for communicating with a communication terminal and executing request processing from the communication terminal, and a communication control device for controlling the node, the communication control device including a changing means for making a change so that a destination node, being one or more nodes in a destination, becomes ready to receive a request from the communication terminal and execute request processing when movement of the communication terminal is detected, and when the node becomes ready for request processing by the changing means, the node receives a request from the communication terminal and executes request processing.

According to the above-described invention, when movement of a communication terminal is detected, one or more nodes in the destination of the communication terminal are made to be ready for request processing, and it is thereby possible to prevent an increase in communication delay even when the communication terminal moves.

Further, in the above-described communication control method, a node that has executed request processing from the communication terminal may be changed not to be ready for request processing or brought down after the destination node becomes ready for request processing. In this case, because the communication control device disables the node to which a processing request from the communication terminal is not expected to be made so that it is unable to perform request processing, it is possible to avoid unnecessary resource consumption.

Further, in the above-described communication control method, making a change so that the destination node becomes ready to receive a request from the communication terminal and execute request processing may be changing a node having a virtual machine for executing request processing from the communication terminal to the destination node. In this manner, by changing a virtual machine for executing request processing to a destination node, it is possible to prevent an increase in communication delay even when a terminal moves.

Further, in the above-described communication control method, the step may change the node for executing request processing from the communication terminal to a node linked to a destination wireless base station of the communication terminal and a node linked to a wireless base station located in the vicinity of the destination wireless base station when movement of the communication terminal is detected. In this case, because a plurality of nodes in the vicinity of the destination of the communication terminal are made to be ready for request processing, it is possible to prevent an increase in communication delay even when the communication terminal continues to move.

Advantageous Effects of Invention

According to one embodiment of the present invention, it is possible to prevent an increase in communication delay even when a terminal moves.

BRIEF DESCRIPTION OF DRAWINGS

FIG. 4 is a view showing a service policy table.

FIG. 5 is a view showing an execution location management table.

FIG. 6 is a view showing an edge installation location correspondence table.

DESCRIPTION OF EMBODIMENTS

An embodiment of the present invention is described hereinafter with reference to the drawings. Note that, in the description of the drawings, the same elements are denoted by the same reference symbols and redundant description thereof is omitted.

Figure 1:
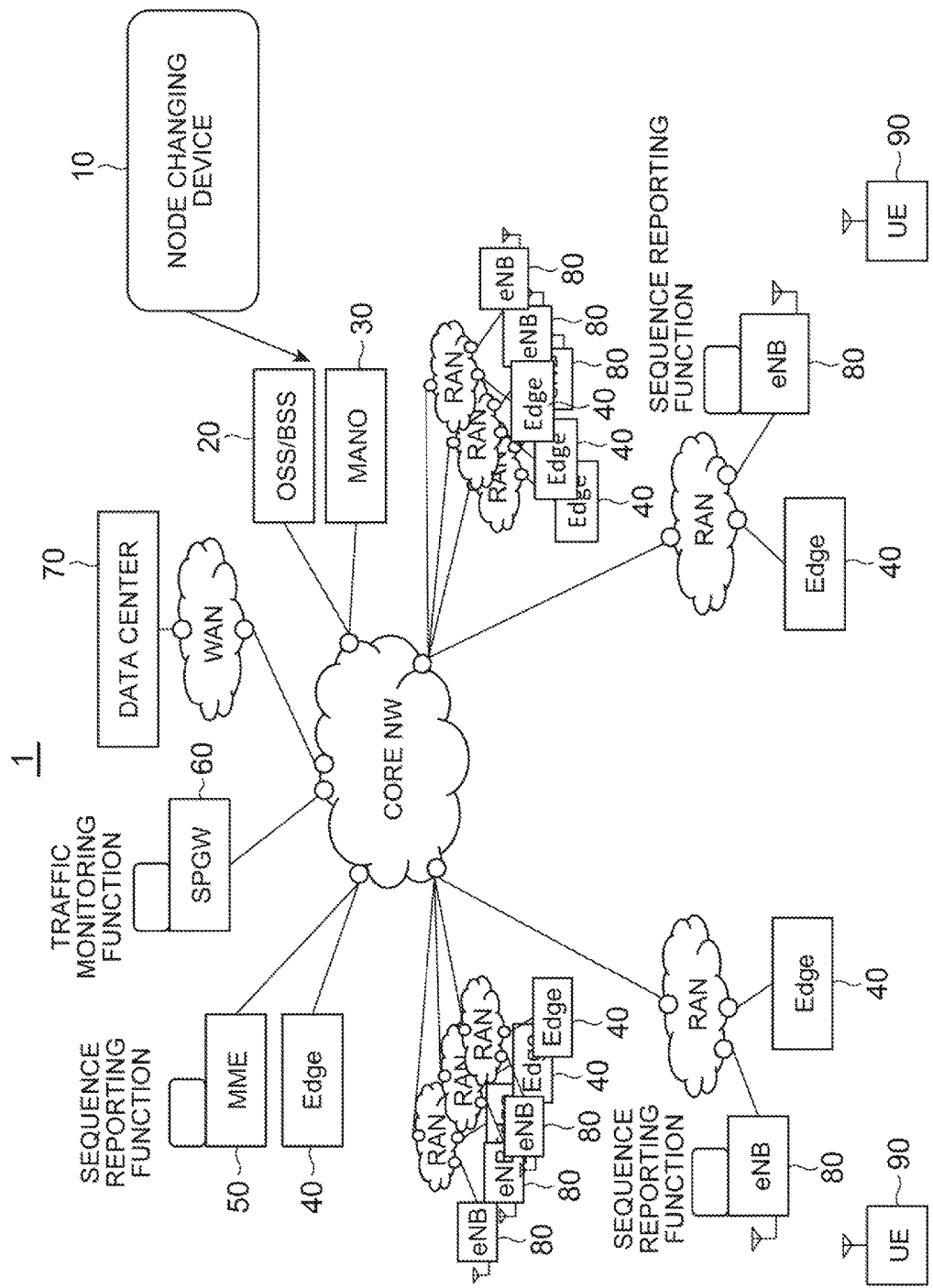
FIG. 1 is a view showing a configuration of a system according to an embodiment of the present invention.

FIG. 1 shows the configuration of a communication system 1 including a node changing device 10 (communication control device) according to this embodiment. The communication system 1 (communication system) is a system that shifts a device to perform processing from an edge 40 that is connected to a self-network such as RAN (Regional Area Network) to a device that is connected to a core network or shifts a device to perform processing from a data center 70 to the edge 40 based on the usage status of a UE 90 (communication terminal). The self-network is a network which is operated by one telecommunications carrier and in which the UE 90 is located.

As shown in FIG. 1, the communication system 1 includes a node changing device 10, an OSS/BSS (Operations Support System/Business Support System) 20, an MANO (Management & Orchestration) 30, an edge 40, an MME 50, an SPGW 60, and a data center 70, an eNodeB 80, and a UE 90.

Among them, the OSS/BSS (Operations Support System/Business Support System) 20, the MANO (Management & Orchestration) 30, some of the edges 40 and the MME 50 constitute a core network of the communication system 1. The eNodeB 80 and some of the edges 40 constitute a RAN. The data center 70 constitutes a WAN (Wide Area Network). Further, the data center 70 can be connected through an external network (network different from the self-network described above) such as a WAN. The components that need to transmit and receive information to and from each other are connected by wired or wireless connection, so that they can transmit and receive information.

The UE 90 is a terminal including a smartphone, a tablet terminal or the like, and it can communicate with the communication system 1 by communication connection. When a service processing request is sent from the UE 90 to the communication system 1, processing of this service (processing of an application) is performed by any device (node) of the edge 40 that is connected to the RAN, the edge 40 that is connected to the core network, and the data center 70.

The distance from the UE 90 increases in the order of the edge 40 connected to the RAN<the edge 40 connected to the core network<the data center 70 connected to an external network. Thus, the edge 40 connected to the RAN which is located at a short distance has the smallest communication delay among the three devices described above. The communication delay is determined by a communication time between a device that performs processing in response to a processing request from the UE 90 (the edge 40 connected to the RAN, the edge 40 connected to the core network, the data center 70) and the UE 90. In this manner, the communication system 1 includes nodes that execute request processing from the UE 90 in a plurality of networks at different distances from the UE 90. Each of the edge 40 connected to the RAN, the edge 40 connected to the core network, and the data center 70 has a distributed database (distributed DB), and shares and stores user data (data such as user setting) at the time of service execution. They replicate difference data of the user data with one another at predetermined intervals.

Further, the edge 40 connected to the RAN, the edge 40 connected to the core network, and the data center 70 connected to the WAN (external network) are connected to networks in different layers (types) from one another. The edge 40 of the RAN performs processing in the vicinity of the UE 90, and therefore a large number of edges are distributed over a wide area. On the other hand, because the data center 70 is accessed from the external network, it performs processing in a centralized manner and therefore is not widely distributed. Thus, if the edges 40 execute the above-described service entirely, while processing results can be provided to the UE 90 immediately, the installation costs and resource costs are high because a large number of them are distributed. On the other hand, because the data center 70 is not widely distributed, if the data center 70 executes the above-described service in an aggregate manner, the installation costs and resource costs can be reduced. However, because the data center 70 is distant from the UE 90, it takes a longer processing time than the case where the edge 40 executes the service.

The node changing device 10 checks the status of a device that performs processing in response to a service request form the UE 90, and changes a device for execution based on the status. This is described in detail later.

The OSS/BSS 20 is a node that performs service management in the communication system 1 and gives instructions related to communication functions in the communication system 1. For example, the OSS/BSS 20 gives the MANO 30 an instruction to add a new communication function (communication service). Further, the BSS/OSS 20 can be operated by a telecommunications carrier related to the communication system 1

The MANO 30 is composed of a NFVO (Network Functions Virtualisation Orchestrator), a VNFM (Virtual Network Function Manager), and a VIM (Virtualised Infrastructure Management). The NFVO is an overall management node (functional entity) that manages the overall virtual network constructed on a physical resource. The VNFM is a virtual communication function management node (functional entity) that adds a function related to a service to a physical resource (node). The VIM is a physical resource management node (functional entity) that manages each of physical resources (nodes). Specifically, it performs management of resource allocation, update and collection, association of a physical resource with a virtualized network, and management of a list of hardware resources and SW resources (hypervisors).

Note that the NFVO, the VNFM and the VIM are implemented by executing a program on a physical server device (note that, however, this does not impose restrictions on implementation on virtualization, and a management system may be separated and implemented on virtualization). The NFVO, the VNFM and the VIM may be implemented by separate physical server devices or may be implemented by the same server device. The NFVO, the VNFM and the VIM (i.e. programs for implementing them) may be provided from different vendors.

The SPGW 60 is an SGW or a PGW. The SGW (Serving Gate Way) is a packet switch that accommodates LTE, and it transmits and receives user data to and from a PGW (Packet data network Gate Way). The PGW is a gateway that connects to an external network, and it performs IP address assignment to the UE 90 or the like.

The MME 50 is a part that performs location management of the UE 90 located in an LTE network, authentication control, and setting of a communication path for user data.

The edge 40 is a server device that performs processing in response to a service request from the UE 90.

The data center 70 is a server device that performs processing in response to a service request from the UE 90. Further, it stores various types of data.

The eNodeB 80 is a wireless base station, and it serves also as a communication control device having a wireless access control function. The eNodeB 80 stores the identifiers of the eNodeB 80 located nearby. When the handover of the UE 90 is carried out, the eNodeB 80 transmits, to the node changing device 10, information about the handover containing the identifiers of the nearby eNodeB 80.

Figure 2:
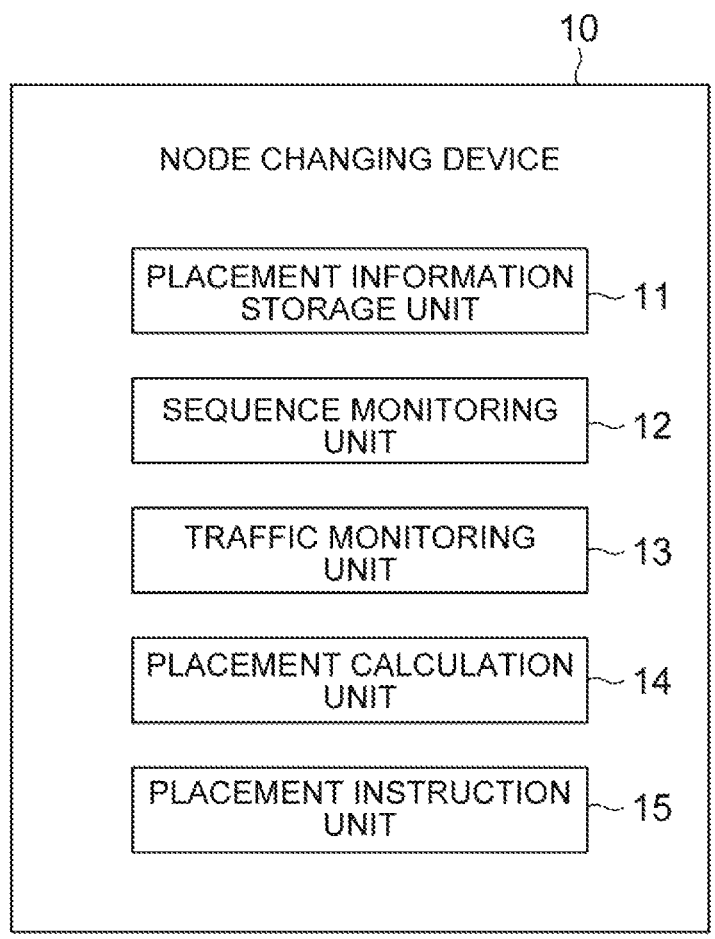
FIG. 2 is a block diagram showing a node changing device according to an embodiment of the present invention.

The functions of the node changing device 10 according to this embodiment are described hereinafter with reference to FIG. 2. As shown in FIG. 2, the node changing device 10 includes a placement information storage unit 11, a sequence monitoring unit 12 (peripheral information acquisition means, detection means), a traffic monitoring unit 13, a placement calculation unit 14 (changing means), and a placement instruction unit 15 (changing means).

Figure 3:
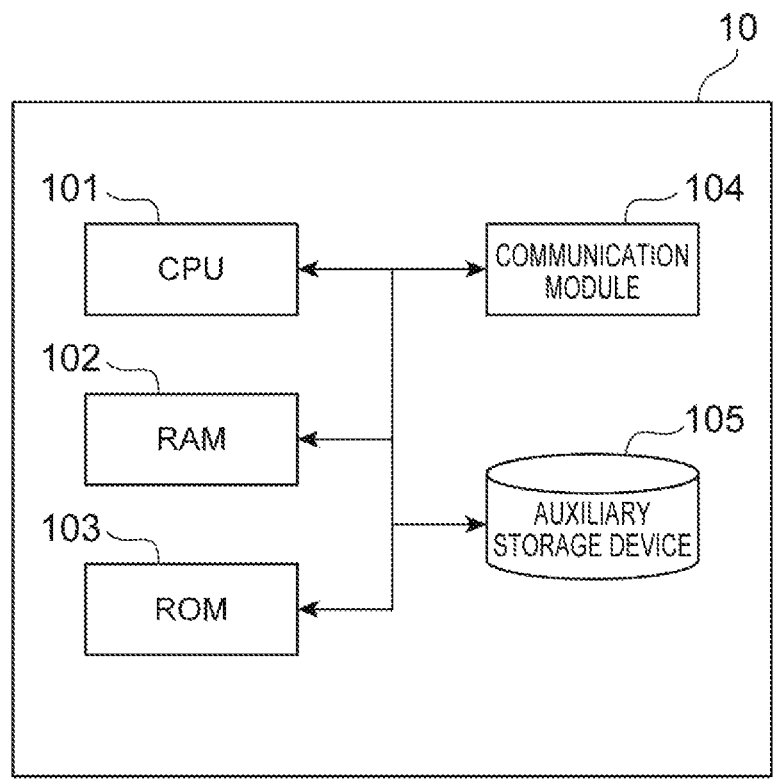
FIG. 3 is a hardware configuration diagram of a node changing device.
Figure 11:
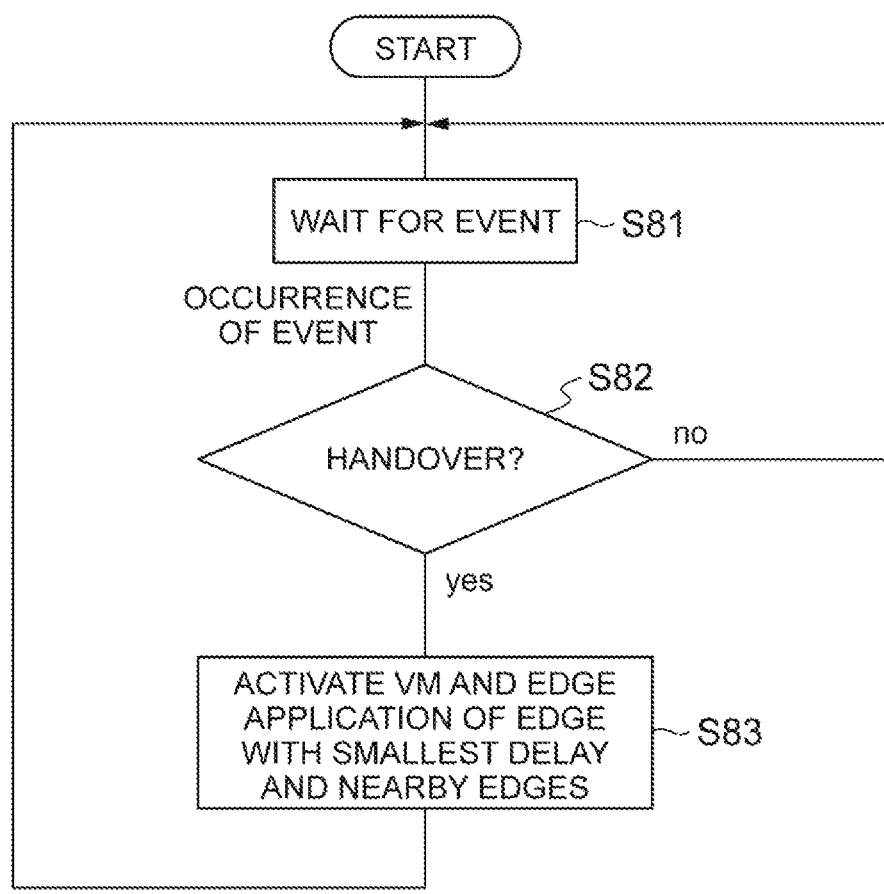
FIG. 11 is a flowchart showing a process of changing an execution device based on handover.

FIG. 11 shows the hardware configuration of a server device that implements the node changing device 10 according to this embodiment. As shown in FIG. 3, the node changing device 10 is configured to include a computer that has hardware such as a CPU 101, a RAM (Random Access Memory) 102 and a ROM (Read Only Memory) 103 serving as a main memory device, a communication module 104 for communication, and an auxiliary storage device 105 such as a hard disk. Those elements operate by a program or the like, and thereby the functions of the node changing device 10 described above are implemented. Note that the node changing device 10 may be configured as a computer system composed of a plurality of server devices.

The placement information storage unit 11 is a part that stores information about the placement of a device that executes processing from the UE 90, such as determination information for changing the placement. The placement information storage unit 11 stores information of a plurality of types of tables. To be specific, the placement information storage unit 11 stores a service policy table that contains information indicating conditions for changing a node for execution, an execution location management table that contains information about a location to execute processing, and an edge installation location correspondence table that contains information indicating an edge corresponding to the eNodeB 80.

FIG. 4 shows an example of the service policy table. As shown in FIG. 4, the service policy table is a table for storing information containing a server application address, a service name, and a policy. The server application address is the address of the data center 70 that has transmitted a policy.

The service name is a name for identifying a service (e.g., a name indicating a video distribution service, an ITS service etc.). The policy is information indicating conditions for changing a node for execution.

The policy with the service name of Service 1 indicates to execute processing from the UE 90 in the edge until it reaches 300 yen per month for one user and execute it in a device other than the edge when it exceeds 300 yen. Further, the policy with the service name of Service 4 indicates to, in the event of handover, follow it (activate the edge 40 which is a destination node of the UE 90). The edge 40 which is a destination node includes the edge 40 that is included in a destination eNodeB 80 of the UE 90, the edge 40 in a certain distance range (e.g., a range with a specified radius) from the destination eNodeB 80 of the UE 90, and the edge 40 corresponding to (linked to) the eNodeB 80 in a certain distance range from the destination eNodeB 80 of the UE 90.

FIG. 5 shows an example of the execution location management table. As shown in FIG. 5, the execution location management table is a table for storing information containing a service name, a location, and a user ID. The service name is a name for identifying a service. The location is information indicating a node that executes the service. The user ID is information for identifying a user. As shown in FIG. 5, when a processing request is sent from the UE 90 of the user with the user ID of User 1, processing is performed by any of the edge 2, the edge 3 and the edge 4. On the other hand, when a processing request is sent from the UE 90 of the user with the user ID of User 2, processing is performed by any of the edge 3, the edge 4 and the edge 5.

FIG. 6 shows an example of the edge installation location correspondence table. As shown in FIG. 6, the edge installation location correspondence table is a table for storing information containing an edge ID, which is an identifier of an edge, and ID indicating the installation location of this edge. By storing the edge identifier and the ID indicating the installation location of this edge in association with each other, it is possible to identify the edge corresponding to the ID indicating the installation location.

The sequence monitoring unit 12 is a part that makes a request for monitoring a sequence to the MME 50 or the like and acquires a result of monitoring the sequence from the MME 50 or the like. To be specific, the sequence monitoring unit 12 makes a monitoring request regarding billing, a monitoring request regarding a circuit class (e.g., 4G, 5G) for connection, and a monitoring request regarding handover. When the sequence monitoring unit 12 receives a monitoring instruction from the placement instruction unit 15, it gives a monitoring instruction (a user ID and a service ID to be monitored, and information indicating a policy to be monitored) to a device for monitoring (e.g., the MME 50).

The sequence monitoring unit 12 receives a monitoring result at specified timing from the device to which it has made a sequence monitoring instruction. In this manner, the sequence monitoring unit 12 receives a monitoring result as information of the usage status of a user. For example, as a monitoring result regarding handover, the sequence monitoring unit 12 receives information regarding handover. The information regarding handover contains information indicating the occurrence of handover, a user ID indicating the UE 90 that has moved, and IDs of a plurality of eNodeB 80 based on the destination of the UE 90. The sequence monitoring unit 12 acquires the information regarding handover and can thereby detect the movement of the UE 90.

The sequence monitoring unit 12 sends the monitoring result to the placement calculation unit 14.

The traffic monitoring unit 13 is a part that makes a request for monitoring the traffic to a router switch or the like and acquires a result of monitoring the traffic from the router switch or the like or the like. When the traffic monitoring unit 13 receives a monitoring instruction from the placement instruction unit 15, it gives a monitoring instruction (a user ID, a service ID, and information indicating a policy to be monitored) to a device for monitoring (e.g., the SPGW).

The traffic monitoring unit 13 receives a monitoring result at specified timing from the device to which the traffic monitoring instruction has been given. In this manner, the traffic monitoring unit 13 receives a monitoring result as information of the usage status of a user, and sends the monitoring result to the placement calculation unit 14.

The placement calculation unit 14 is a part that determines a device to perform processing in response to a service request from the UE 90. When the placement calculation unit 14 receives a new service request from the UE 90, the placement calculation unit 14 determines a device for execution based on a policy.

To be specific, when it is determined to execute processing in the edge that is connected to the RAN, the placement calculation unit 14 determines the edge which is the closest to the UE 90 as the device for execution based on the location of the UE 90.

Further, when the placement calculation unit 14 receives a monitoring result from the sequence monitoring unit 12 or the traffic monitoring unit 13 and when the monitoring result satisfies the conditions to change a device for execution based on the policy in the service policy table, the placement calculation unit 14 determines to change a device for execution. For example, when the handover of the UE 90 is detected, the placement calculation unit 14 determines to change a device for execution to the edge 40 (the edge 40 with the smallest delay) linked to the destination (handover destination) eNodeB 80 of the UE 90 and the edge 40 linked to the eNodeB 80 in the vicinity of that eNodeB 80 (the eNodeB 80 located in a specified range from the destination eNodeB 80 of the UE 90). In this manner, the placement calculation unit 14 determines to change a device for execution to the peripheral edge 40 (the edge 40 which is the destination node of the UE 90) based on the destination of the UE 90.

Figure 7:
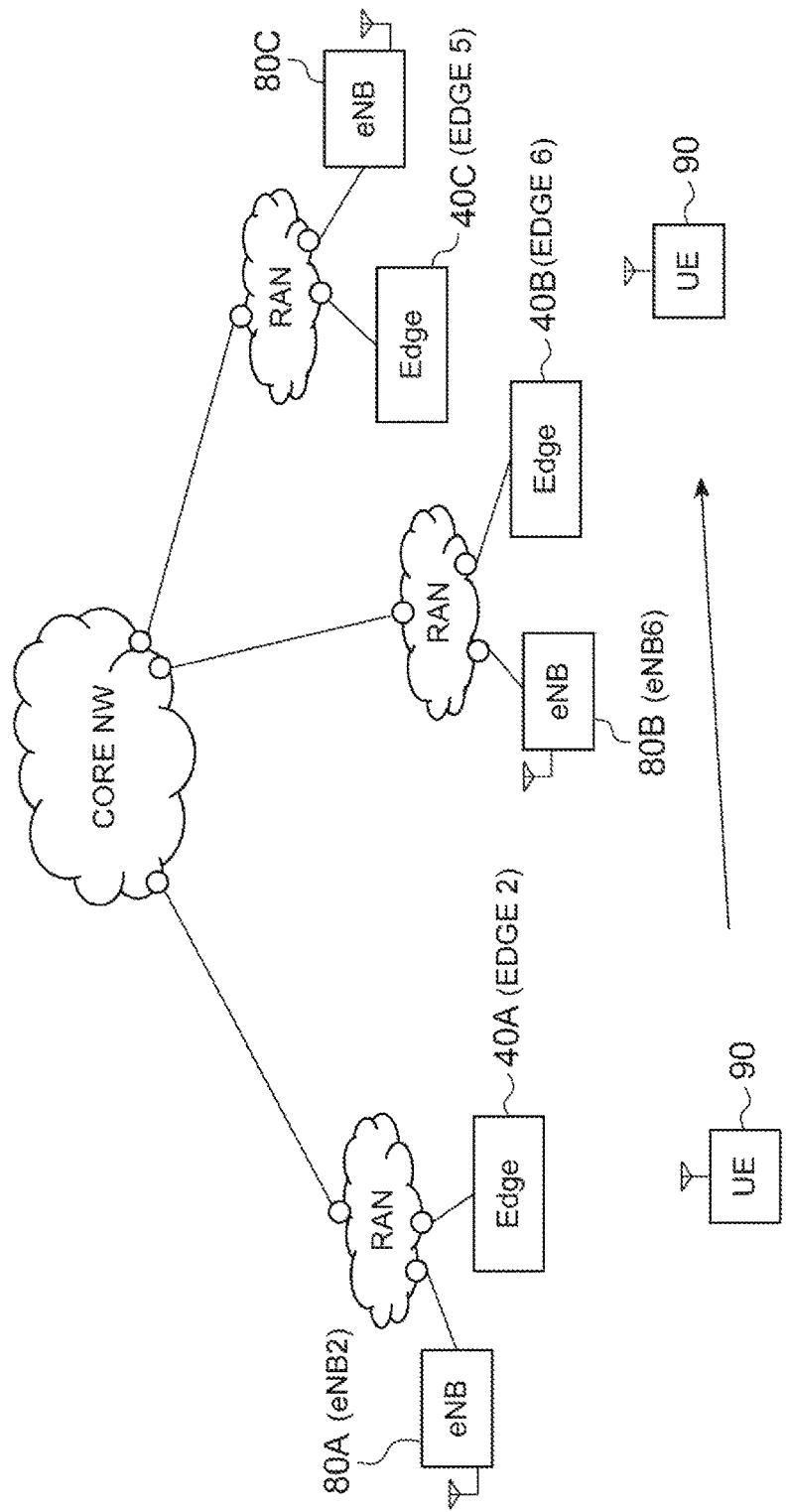
FIG. 7 is a view showing a node change based on movement of a UE 90.i
Figure 8:
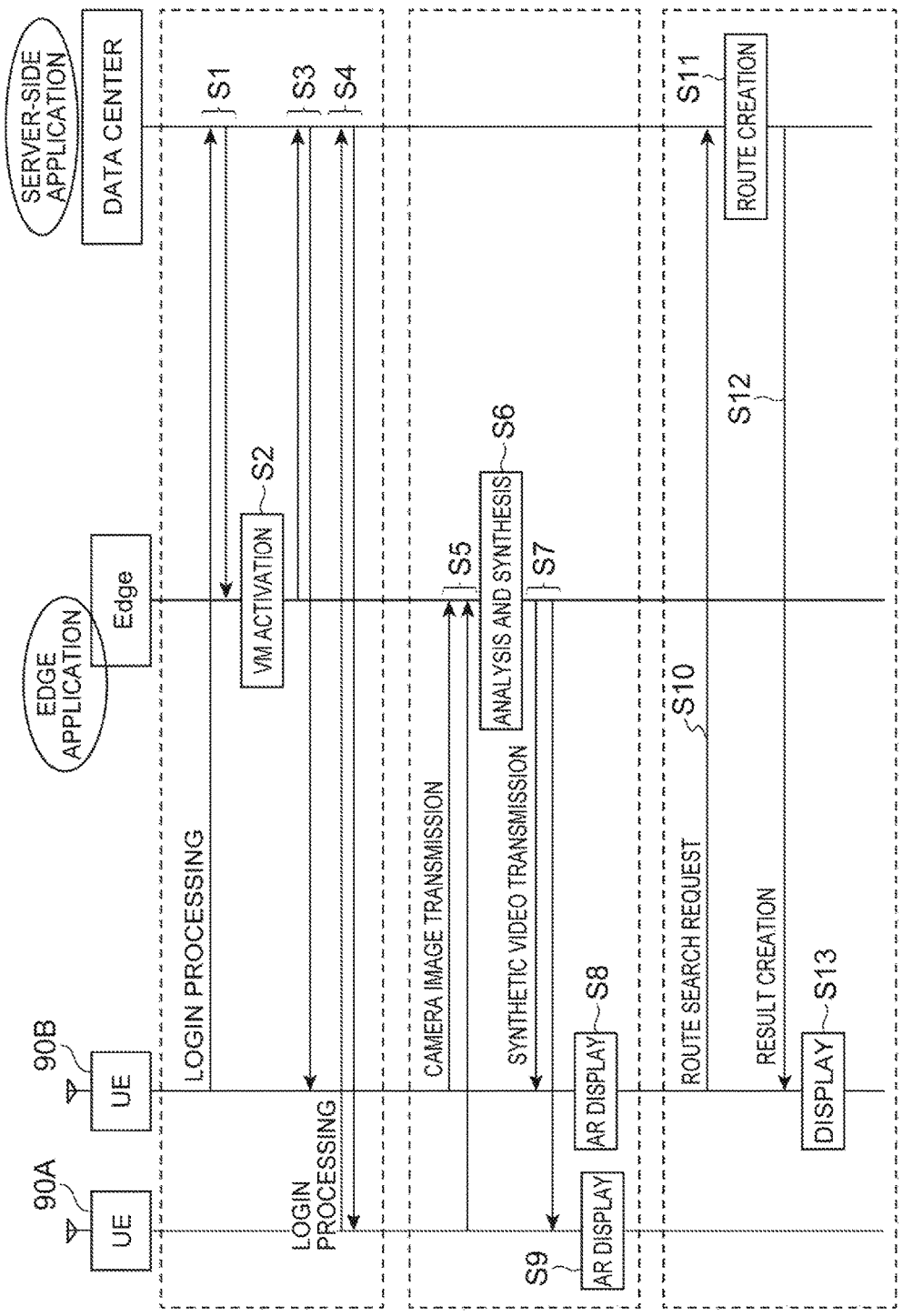
FIG. 8 is a sequence chart showing an application execution example.

As shown in FIG. 7, it is assumed that the UE 90 is moved from the vicinity of the eNodeB 80A to the vicinity of the eNodeB 80B. In this case, the placement calculation unit 14 determines to change to the edge 40B (edge 6) of the eNodeB 80B (eNodeB 6) and the edge 40C (edge 5) of the eNodeB 80C in the vicinity of the eNodeB 80B.

In this manner, the placement calculation unit 14 determines to change a node to execute request processing from the UE 90 based on a monitoring result acquired by the sequence monitoring unit 12 or the traffic monitoring unit 13.

The placement instruction unit 15 receives a device for processing (the edge 40, the data center 70 etc.) from the placement calculation unit 14, and gives the MANO 30 a placement change instruction to this device. In response thereto, the MANO 30 gives the target device an instruction to execute service request processing of the UE 90.

The processing in the communication system 1 is described hereinafter with reference to FIGS. 8 to 11. First, processing in the case of executing, as a service, an application related to traffic conditions to be executed in an in-vehicle terminal is described. To be specific, the application related to traffic conditions includes the function of synthesizing images around vehicle taken by a plurality of users and the function of a route search.

Further, it is assumed that the application related to traffic conditions to be executed in an in-vehicle terminal includes an application to be executed in an edge (edge application) and an application to be executed in a data center (server-side application).

To be specific, in the edge application, processing to display and output an image generated by synthesizing a result of analyzing an image showing the traffic conditions (e.g., an image in front of a vehicle) and this image. The server-side application (server-side) carries out a route search based on a request for a route search.

When the UE 90B transmits a login request to the data center 70, it notifies the edge 40 of a login request (Step S1). In response thereto, the edge 40 activates a VM (Virtual Machine) into the state of being ready for executing the edge application (Step S2).

After activating the VM, the edge 40 notifies the data center 70 that the VM has been activated, and further the data center 70 notifies the UE 90B that the VM has been activated (Step S3).

The UE 90A makes a login request to the data center 70, and the data center 70 notifies the UE 90A of receipt of a login and a destination address (Step S4).

When the UE 90A and the UE 90B transmit images taken by themselves to the edge 40 (Step S5), the edge 40 analyzes and synthesizes those images (Step S6).

The edge 40 transmits the synthetic image to the UE 90A and the UE 90B (Step S7). The UE 90A and the UE 90B displays the received image by AR (augmented reality) (Step S8 and Step S9).

Further, the UE 90B makes a request for a route search to the data center 70 (Step S10), and the data center 70 creates a route in response thereto (Step S11). The data center 70 transmits this route to the UE 90B (Step S12). The UE 90B displays and outputs this route (Step S13).

In this manner, the function for which the immediacy is required, such as display of an image taken, is processed by the edge 40 with the small delay, and the function for which the immediacy is not required, such as a route search, is processed by the data center 70.

Figure 9:
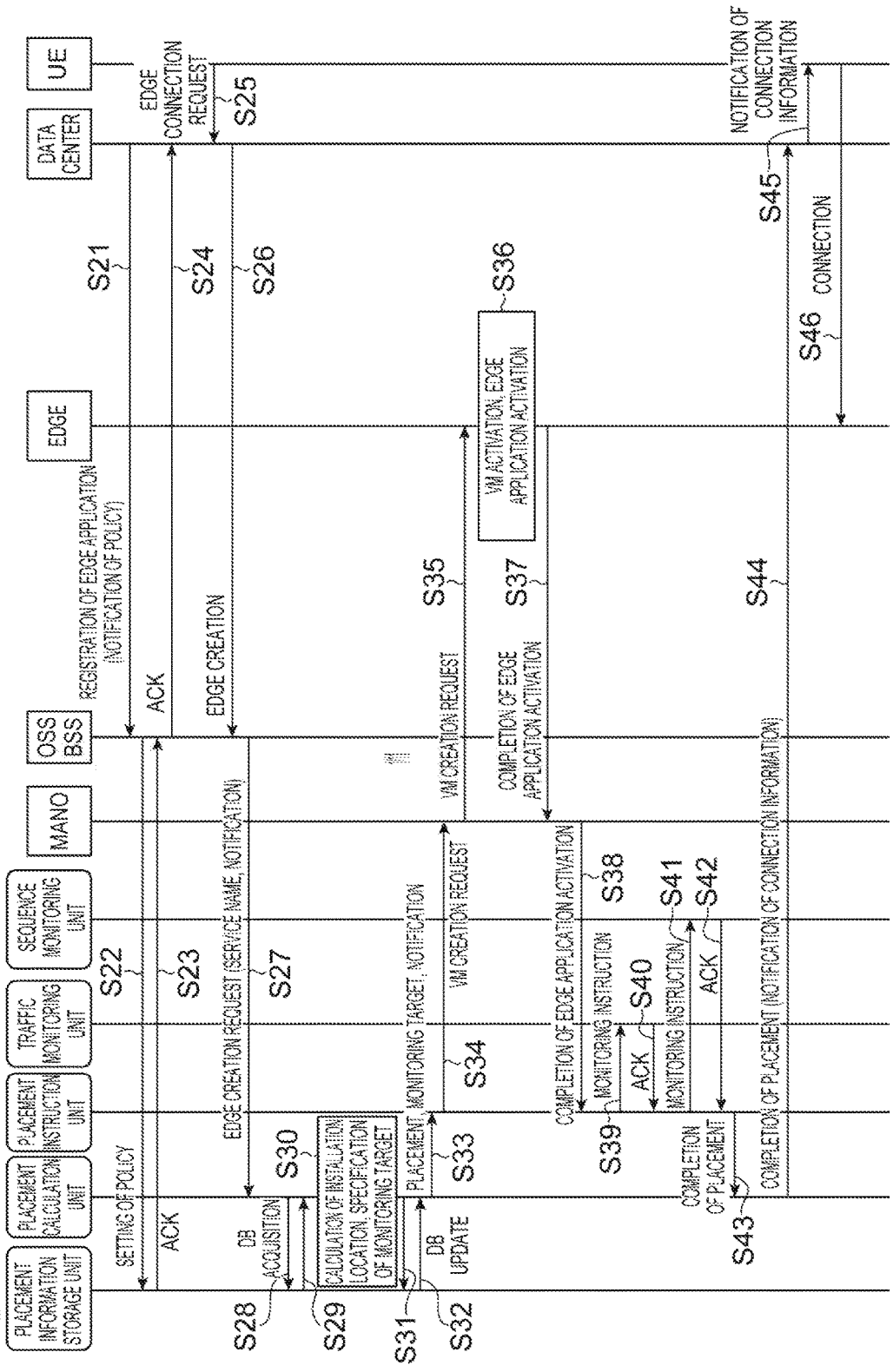
FIG. 9 is a sequence chart showing an edge activation process.

The procedure for policy registration and VM creation is described hereinafter with reference to the sequence chart of FIG. 9.

Further, when a policy input operation is performed in the data center 70, the data center 70 sends a request for policy registration, together with a service name to which the policy is applied and the content of the policy, to the OSS/BSS 20 (Step S21). In response thereto, the OSS/BSS 20 makes a policy setting request to the node changing device 10 (Step S22). The node changing device 10 registers the service name to which the policy is applied and the content of the policy into the service policy table. The node changing device 10 gives the OSS/BSS 20 a notification that the registration has completed (Step S23). The OSS/BSS 20 sends this notification to the data center 70 (Step S24). By the processing of Steps S21 to S24, the policy is registered into the service policy table in the node changing device 10.

When an edge connection request (a request for executing a service to be executed in the edge as a general rule) is sent from the UE 90 to the data center 70 (Step S25), the data center 70 sends a notification about the service name and the address of the UE 90 and also sends an edge creation request to the OSS/BSS 20 (Step S26). The OSS/BSS 20 makes an edge creation request to the node changing device 10 (Step S27).

The node changing device 10 refers to the service policy table corresponding to the service name (Step S28, Step S29). The placement calculation unit 14 determines a device for execution based on the content of the service policy table (Step S30). Further, the placement calculation unit 14 determines a monitoring target indicating the detail of monitoring (e.g., information indicating a service, a user ID, and handover etc.).

The placement calculation unit 14 of the node changing device 10 registers information that associates the device for execution and the user ID of the UE 90 that has made the service request into the execution location management table (Step S31 and Step S32).

The placement calculation unit 14 of the node changing device 10 notifies the placement instruction unit 15 of a monitoring request and a placement request (Step S33). In response to the placement request, the placement instruction unit 15 sends a notification about the service name and the address of the edge and also sends a VM creation request to the MANO 30.

In response to the VM creation request, the MANO 30 sends a notification about the service name and also makes a VM creation request to the edge 40, which is a device as a request target (Step S35).

The edge 40 makes preparations for activating the VM and also activates the edge application to operate on the VM (Step S36). The edge 40 thereby enters the state of being ready to execute request processing from the UE 90. The edge 40 sends an edge application activation completion notification to the MANO 30 (Step S37). In response thereto, the MANO 30 gives the edge application activation completion notification to the node changing device 10 (Step S38).

The placement instruction unit 15 gives a monitoring instruction to the traffic monitoring unit 13 (Step S39). In response thereto, the traffic monitoring unit 13 gives a monitoring instruction to a target device, and sends a result of carrying out the monitoring instruction to the placement instruction unit 15 (Step S40).

The placement instruction unit 15 gives a monitoring instruction to the sequence monitoring unit 12 (Step S41). In response thereto, the sequence monitoring unit 12 gives a monitoring instruction to a target device, and sends a result of carrying out the monitoring instruction to the placement instruction unit 15 (Step S42).

The placement instruction unit 15 gives a placement completion notification to the placement calculation unit 14 (Step S43). In response thereto, the placement calculation unit 14 transmits connection information (destination address) to the data center 70 (Step S44). The data center 70 notifies the UE 90 of the connection information (Step S45), and the UE 90 connects to the edge 40 based on the connection information (Step S46).

Figure 10:
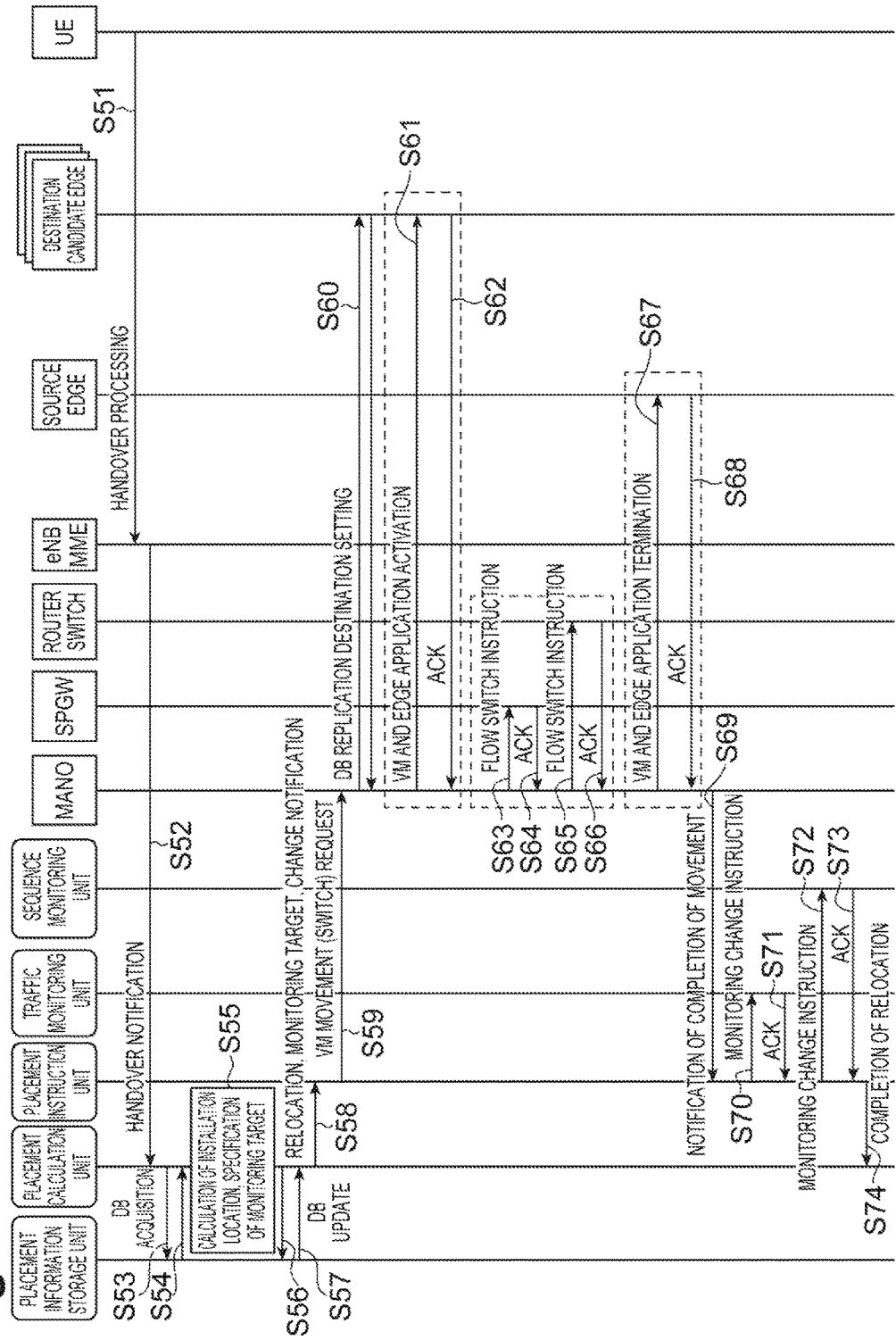
FIG. 10 is a sequence chart of changing an execution device based on handover.

A process to change a device for execution is described hereinafter with reference to the sequence chart of FIG. 10. When the UE 90 makes a location registration request (handover processing) to the eNodeB 80 (Step S51), the eNodeB 80 gives a handover notification to the placement calculation unit 14 through the sequence monitoring unit 12 and also transmits information indicating the destination eNodeB 80 (information related to handover) thereto (Step S52).

The node changing device 10 refers to the service policy table, the execution location management table, and the edge installation location correspondence table (Step S53 and Step S54).

The placement calculation unit 14 determines a device for execution based on the content of the service policy table, the execution location management table, and the edge installation location correspondence table (Step S55). When the sequence monitoring unit 12 receives information from the eNodeB 80, the placement calculation unit 14 acquires, from the sequence monitoring unit 12, the user ID of the UE 90 and information indicating the eNodeB 80 in the vicinity of the destination eNodeB 80 (ID of the eNodeB 80) contained in the information about handover. The placement calculation unit 14 refers to the edge installation location correspondence table and specifies the edge corresponding to the ID of the eNodeB 80 in the vicinity. Further, the placement calculation unit 14 determines a monitoring target (e.g., information indicating a service, a user ID, and handover etc.).

The placement calculation unit 14 of the node changing device 10 registers information that associates the device for execution and the user ID of the UE 90 that has made the service request into the execution location management table (Step S56 and Step S57). The placement calculation unit 14 registers information that associates the specified edge and the above user ID into the execution location management table. Further, the placement calculation unit 14 extracts, among the edges associated with this user ID, an edge that is different from the above specified edge and that is not associated with a user ID different from the above user ID, as an edge to be brought down, from the information in the execution location management table. The placement calculation unit 14 deletes the user ID part of the information that associates the extracted edge and the user ID in the execution location management table.

The placement calculation unit 14 of the node changing device 10 notifies the placement instruction unit 15 of a monitoring request and a placement request (Step S58). As the placement request, a plurality of destination candidate edges 40 (e.g., the edge 40 of the destination eNodeB 80 of the UE 90, the edge 40 of the eNodeB 80 in the vicinity of that eNodeB 80) and the edges 40 to be brought down including the source edge 40 are notified. In response to the placement request, the placement instruction unit 15 notifies the MANO 30 of the destination candidate edges 40 and the edges 40 to be brought down including the source edge 40, and also makes a VM and edge application activation request (VM movement request) (Step S59). The MANO 30 sets a distributed DB replication destination to the destination candidate edges 40, and makes a user information registration request to the destination candidate edges 40 (Step S60). Further, the MANO 30 inhibits the subsequent update of the distributed DB of the source edge 40. After the destination candidate edges 40 complete the registration of user information, they notify the MANO 30 of the completion (Step S60).

The MANO 30 makes a VM and edge application activation request to the destination candidate edges 40 (Step S61). Each of the destination candidate edges 40 activates the VM and the edge application in response to the VM and edge application activation request, and notifies the MANO 30 of the activation (Step S62).

The MANO 30 gives a flow switch instruction to the SPGW 60 (Step S63), and the SPGW 60 performs flow switch in response thereto, and notifies the MANO 30 of the completion of processing (Step S64). Further, the MANO 30 gives a flow switch instruction to the router switch (Step S65). When the router switch completes the switch, it notifies the MANO 30 of the completion (Step S66). In this manner, in response to a processing request from the UE 90, the MANO 30 sets a communication path so that the data center 70 performs this processing. Note that the MANO 30 sets a communication path for each of the plurality of destination candidate edges 40.

The MANO 30 gives a notification about VM completion to the edges 40 to be brought down including the source edge 40 (Step S67), and the edges 40 to be brought down including the source edge 40 perform end processing (processing to stop the edge application and the VM) in response thereto (Step S67). The edges 40 thereby cancel the state of being ready to execute request processing from the UE 90 (change into the state of being unready for request processing). When the processing is completed, the completion is notified to the MANO 30 (Step S68).

The MANO 30 gives a movement completion notification to the placement instruction unit 15 (Step S69). The placement instruction unit 15 gives a monitoring change instruction to the sequence monitoring unit 12 (Step S70), and receives a completion notification from the sequence monitoring unit 12 (Step S71).

The placement instruction unit 15 gives a monitoring termination instruction to the traffic monitoring unit 13 (Step S72), and receives a completion notification from the traffic monitoring unit 13 (Step S73). After that, the placement instruction unit 15 notifies the placement calculation unit 14 of the completion of relocation (Step S74).

A process for the placement calculation unit 14 to make a determination about movement (Step S55 in FIG. 10) is described hereinafter with reference to the flowchart of FIG. 11.

The placement calculation unit 14 waits for a movement change event at all times (Step S81). When the placement calculation unit 14 receives an event notification from the sequence monitoring unit 12, it checks whether the event notification indicates handover or not (Step S82). When the event notification does not indicate handover, the process returns to Step S81. When, on the other hand, the event notification indicates handover (Yes in Step S82), the placement calculation unit 14 activates the VM and edge application of the edge 40 (the edge 40 with the smallest delay) of the destination eNodeB 80 and further activates the VM and edge application of the edge 40 of the eNodeB 80 in the vicinity of the destination (Step S83).

Although the case where the node changing device 10 is implemented by one server device is described in the above embodiment, the functions of the node changing device 10 may be implemented by a plurality of server devices.

Although the case of activating the edge 40 with the smallest delay and the edge 40 in the eNodeB 80 in the vicinity of the destination eNodeB 80 is described in the above embodiment, only the edge with the smallest delay may be activated, or all edges 40 may be activated in advance.

Although the case where the node changing device 10 makes a request for activating a VM and an edge application to a plurality of destination candidate edges 40 and thereby the destination candidate edges 40 become ready for request processing from the UE 90 is described in the above embodiment, in the case where the destination candidate edges 40 activate a VM and an edge application in advance, they may become the state of being ready to receive a processing request from the UE 90 by taking over the user data (replicating the database).

The node changing device 10 may determine whether movement to a destination node is possible or not, although not particularly described in the above embodiment. As an example of the determination, the node changing device 10 acquires, from the MANO 30, information about the number of CPUs, the memory capacity and the disk capacity of a destination node, the number of communication terminals/the number of sessions connected to the destination node and the NW band, compares the acquired information with a preset threshold, and determines whether movement to the destination node is possible or not. Further, as another example of the determination, the node changing device 10 may acquire, from the MANO 30, information indicating the amount of loads on nodes that are needed for a destination node to perform processing (e.g, the SPGW 60, a local gateway (LGW), a DPI (Deep Packet Inspection), a DNS (Domain Name Server) etc.), compare the acquired information with a preset threshold, and determine whether movement to the destination node is possible or not. Note that, in the case where the node that is needed for the destination node to perform processing is a non-virtualized device, the amount of loads may be managed by each destination node, or the amount of loads may be managed by a dedicated management system for a mobile edge computer (a system different from the MANO 30). Furthermore, as another example of the determination, the node changing device 10 may acquire, from a base station device or the MANO 30 (when a base station device is managed on a virtualization platform), information about the capacity of radio equipment (the usage rate of a radio resource block, the CPU usage rage of a base station device etc.) in a destination node, compare the acquired information with a preset threshold, and determine whether movement to the destination node is possible or not.

When, as a result of determining whether movement to a destination node is possible or not, the node changing device 10 determines that the movement is not possible, it moves a low-priority application assigned to the destination node to another node and then moves the node again. Further, when, as a result of determining whether movement to a destination node is possible or not, the node changing device 10 determines that the movement is not possible, if enhancement of equipment is possible by scale-out, scale-up etc. of the SPGW 60, the DNS or the like, it moves the node after the enhancement.

The operations and effects of the node changing device 10 according to this embodiment are described hereinafter. In the node changing device 10 according to this embodiment, the sequence monitoring unit 12 detects handover of the UE 90. When the handover is detected, the placement calculation unit 14 makes a change so that destination nodes, which are one or more nodes in a destination, can receive a request from the UE 90 and perform request processing. To be specific, the destination node changes the edge 40 having the VM that executes request processing from the UE 90 to the destination edge 40.

Because the node changing device 10 activates a plurality of edges 40, which are destination nodes, as described above, it is possible to prevent an increase in communication delay even when the UE 90 moves.

After a request from the UE 90 is received and it becomes ready for request processing, the placement calculation unit 14 brings down the edge 40 that has received a request from the UE 90 before detecting movement. Because the node changing device 10 brings down the edge 40 to which a processing request from the UE 90 is not expected to be made, it is possible to avoid unnecessary resource consumption.

Because the placement calculation unit 14 activates the edge 40 linked to the eNodeB 80 in the destination of the UE 90 and the edge 40 linked to the eNodeB 80 in the vicinity of that eNodeB 80, it is possible to prevent an increase in communication delay even when the UE 90 continues to move.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

The information, signals and the like described in the present specification may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present specification and/or the term needed to understand the present specification may be replaced by a term having the same or similar meaning. For example, a channel and/or a symbol may be a signal. Further, a signal may be a message. Furthermore, a component carrier (CC) may be called a carrier frequency, a cell or the like.

The terms "system" and "network" used in the present specification are used to be compatible with each other.

Further, information, parameters and the like described in the present specification may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present specification in some cases. Because various channels (e.g., PUCCH, PDCCH etc.) and information elements (e.g., TPC etc.) can be identified by every appropriate names, various names assigned to such various channels and information elements are not definitive in any way.

A base station can accommodate one or a plurality of (e.g., three) cells (which are also called sectors). In the case where a base station accommodates a plurality of cells, the coverage area of the base station can be partitioned into a plurality of smaller areas, and each of the smaller areas can provide a communication service by a base station subsystem (e.g., an indoor-type small base station RRH:Remote Radio Head). The term "cell" or "sector" indicates a base station that performs a communication service in this coverage and/or a part or the whole of the coverage area of a base station sub-system. Further, the terms "base station", "eNB", "cell" and "sector" can be used to be compatible with one another. The base station is referred to by terms such as a fixed station, a NodeB, an eNodeB (eNB), an access point, a femtocell, and a small cell in some cases.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term "determining" used in the present specification includes a variety of operations. For example, "determining" can include regarding the act of judging, calculating, computing, processing, deriving, investigating, looking up (e.g., looking up in a table, a database or another data structure), ascertaining or the like as being "determined". Further, "determining" and can include regarding the act of receiving (e.g., receiving information), transmitting (e.g., transmitting information), input, output, accessing (e.g., accessing data in a memory) or the like as being "determined". Further, "determining" can include regarding the act of resolving, selecting, choosing, establishing, comparing or the like as being "determined". In other words, "determining" can include regarding a certain operation as being "determined".

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. When used in the present specification, it is considered that two elements are "connected" or "coupled" to each other by using one or more electric wires, cables and/or printed electric connections and, as several non-definitive and non-comprehensive examples, by using electromagnetic energy such as electromagnetic energy having a wavelength of a radio frequency region, a microwave region and an optical (both visible and invisible) region.

Further, the description "based on" used in the present specification does not mean "based only on" unless otherwise noted. In other words, the description "based on" means both of "based only on" and "based at least on".

Furthermore, "means" in the configuration of each device described above may be replaced by "unit", "circuit", "device" or the like.

As long as "including", "comprising" and transformation of them are used in the present specification or claims, those terms are intended to be comprehensive like the term "comprise". Further, the term "or" used in the present specification or claims is intended not to be exclusive OR.

Note that notification of information may be made by another method, not limited to the aspect/embodiment described in the present specification. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each aspect/embodiment described in the present specification may be applied to LTE (Long Term Evolution), LTE-A (LTE Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), a system using another appropriate system and/or a next generation system extended based on these systems.

The procedure, the sequence, the flowchart and the like in each aspect/embodiment described in the present specification may be in a different order unless inconsistency arises. For example, for the method described in the present specification, elements of various steps are described in an exemplified order, and it is not limited to the specific order described above.

Further, a specific operation that is performed in a base station in the present specification is performed in an upper node in some cases. In a network composed of one or a plurality of network nodes having a base station, various operations that are performed for communication with a terminal can be performed by a base station and/or another network node different from a base station (e.g., MME or S-GW, though not limited thereto) as a matter of course. Although the case where one another network node different from a base station is used is described in an example above, a combination of a plurality of other network nodes (e.g., MME and S-GW) may be used.

The above-described information or the like can be output from an upper layer (or lower layer) to a lower layer (or upper layer). It may be input and output through a plurality of network nodes.

Input/output information or the like may be stored in a specific location (e.g., memory) or managed in a management table. Further, input/output information or the like can be overwritten or updated, or additional data can be written. Output information or the like may be deleted. Input information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each aspect/embodiment described in the present specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

In the present disclosure, reference to an element includes both one and more than one of such element unless it is clearly stated that it is singular.

Although the present invention is described in detail in the foregoing, it is apparent to those skilled in the art that the present invention is not restricted to the embodiment described in the present specification. The present invention can be implemented as a modified and changed form without deviating from the spirit and scope of the present invention defined by the appended claims. Accordingly, the description of the present specification is given merely by way of illustration and does not have any restrictive meaning to the present invention,

REFERENCE SIGNS LIST

1 . . . communication system, 10 . . . node changing device, 11 . . . placement information storage unit, 12 . . . sequence monitoring unit, 13 . . . traffic monitoring unit, 14 . . . placement calculation unit, 15 . . . placement instruction unit, 20 . . . OSS/BSS, 30 . . . MANO, 40 . . . edge, 50 . . . MME, 60 . . . SPGW, 70 . . . data center, 80 . . . eNodeB, 90 . . . UE, 101 . . . CPU, 102 . . . RAM, 103 . . . ROM, 104 . . . communication module, 105 . . . auxiliary storage device

The invention claimed is:

1. A communication control method in a communication system including a node for communicating with a communication terminal and executing request processing from the communication terminal without requesting another node for processing, the method comprising:
    making a change so that a first destination node, being a node linked to a destination wireless base station, and a second destination node, being a node linked to a wireless base station located within a specified range of the destination wireless base station, become ready to receive a request from the communication terminal and execute request processing, the making of the change being performed in response to a notification received by a node changing device from a management device configured to perform mobility management on the communication terminal when handover processing of the communication terminal is detected by the management device,
    wherein the making of the change includes the first and second destination nodes activating a virtual machine for executing request processing,
    the destination wireless base station pre-stores identifiers relating to other wireless base stations in the specified range of the destination wireless base station, and
    the wireless base station located in the specified range of the destination wireless base station is identified in accordance with the destination wireless base station.

2. The communication control method according to claim 1, wherein a node that has executed request processing from the communication terminal terminates a virtual machine for executing the request processing after the destination node becomes ready for request processing.

3. The communication control method according to claim 1, wherein
    the making of the change includes changing a node having a virtual machine for executing request processing from the communication terminal to the destination node.

4. A communication control device in a communication system including a node for communicating with a communication terminal and executing request processing from the communication terminal without requesting another node for processing, the communication control device comprising:
    circuitry configured to
    make a change so that a first destination node, being a node linked to a destination wireless base station, and a second destination node, being a node linked to a wireless base station located within a specified range of the destination wireless base station, become ready to receive a request from the communication terminal and execute request processing, the making of the change being performed in response to a notification received by a node changing device from a management device configured to perform mobility management on the communication terminal when handover processing of the communication terminal is detected by the management device,
wherein the circuitry is configured to make the change such that the first and second destination nodes activate a virtual machine for executing request processing,
the destination wireless base station pre-stores identifiers relating to other wireless base stations in the specified range of the destination wireless base station, and
the wireless base station located in the specified range of the destination wireless base station is identified in accordance with the destination wireless base station.

5. A communication system including a node for communicating with a communication terminal and executing request processing from the communication terminal without requesting another node for processing, and a communication control device for controlling the node, the communication control device comprising:
circuitry configured to
make a change so that a first destination node, being a node linked to a destination wireless base station, and a second destination node, being a node linked to a wireless base station located within a specified range of the destination wireless base station, become ready to receive a request from the communication terminal and execute request processing, the making of the change being performed in response to a notification received by a node changing device from a management device configured to perform mobility management on the communication terminal when handover processing of the communication terminal is detected by the management device, wherein
the circuitry is configured to make the change such that the first and second destination nodes activate a virtual machine for executing request processing,
the destination wireless base station pre-stores identifiers relating to other wireless base stations in the specified range of the destination wireless base station,
the wireless base station located in the specified range of the destination wireless base station is identified in accordance with the destination wireless base station, and
when the node becomes ready for request processing, the node receives a request from the communication terminal and executes request processing.

* * * * *